(12) United States Patent
Gobriel et al.

(10) Patent No.: US 8,023,522 B2
(45) Date of Patent: Sep. 20, 2011

(54) ENABLING LONG-TERM COMMUNICATION IDLENESS FOR ENERGY EFFICIENCY

(75) Inventors: Sameh Gobriel, Hillsboro, OR (US); Christian Maciocco, Portland, OR (US); Tsung-Yuan Charles Tai, Portland, OR (US); Sanjay Bakshi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 12/414,464

(22) Filed: Mar. 30, 2009

(65) Prior Publication Data

US 2010/0246591 A1 Sep. 30, 2010

(51) Int. Cl.
*G08C 17/00* (2006.01)
*G06F 1/26* (2006.01)

(52) U.S. Cl. ......... 370/412; 370/311; 709/224; 713/320

(58) Field of Classification Search .......... 370/252–311, 370/401–419; 709/208–224; 713/232–238, 713/310–323
See application file for complete search history.

(56) References Cited

U.S. PATENT DOCUMENTS

| | | | |
|---|---|---|---|
| 5,778,175 A | | 7/1998 | Paul et al. |
| 5,900,026 A | * | 5/1999 | Ryu .............................. 713/320 |
| 6,408,395 B1 | * | 6/2002 | Sugahara et al. ............. 713/310 |
| 6,529,518 B1 | | 3/2003 | Webber |
| 6,701,442 B1 | * | 3/2004 | Kunz et al. .................... 713/300 |
| 6,931,555 B2 | * | 8/2005 | Osborn ......................... 713/320 |
| 7,574,505 B2 | * | 8/2009 | Park et al. ..................... 709/224 |
| 7,734,942 B2 | * | 6/2010 | Dahlen et al. ................. 713/323 |
| 7,787,406 B2 | * | 8/2010 | Park et al. ..................... 370/311 |
| 2007/0106920 A1 | * | 5/2007 | Lee et al. ...................... 713/320 |
| 2007/0115873 A1 | * | 5/2007 | Kim et al. ..................... 370/318 |
| 2009/0147696 A1 | * | 6/2009 | Park et al. ..................... 370/252 |
| 2009/0217066 A1 | * | 8/2009 | Mani et al. .................... 713/320 |

FOREIGN PATENT DOCUMENTS

| KR | 20040009225 | 1/2004 |
|---|---|---|
| KR | 20090029998 | 3/2009 |

OTHER PUBLICATIONS

Jung, Yoo Sun, "International Search Report and the Written Opinion of the International Searching Authority", Patent Cooperation Treaty, Sep. 28, 2010, 8 pages, Korean Intellectual Property Office, Daejeon, Republic of Korea.

Gobriel, Sameh, et al., "Long Idle: Making Idle Networks Quiet for Platform Energy-Efficiency", Circuits and Systems Research Lab, Intel Labs, Intel Corporation, International Conference on Systems and Networks Communications 2010, presented Aug. 2010, 8 pages.

Gobriel, Sameh, et al., "When Idle is not Quite: Energy-Efficient Platform Design in Presence of Network Background and Management Traffic", Circuits and Systems Research Lab, Intel Labs, Intel Corporation, Globecom 2010, Publication presented Dec. 2010, 6 pages.

\* cited by examiner

*Primary Examiner* — M. Phan
(74) *Attorney, Agent, or Firm* — Blakely, Sokoloff, Taylor & Zafman LLP

(57) ABSTRACT

A network adapter comprises a controller to change to a first mode from a second mode based on a number of transmit packets, sizes of received packets, and intervals between arrivals of the received packets. In one embodiment, the network controller further comprises a memory to buffer received packets, where the received packets are buffered for a longer period in the first mode than in the second mode.

22 Claims, 6 Drawing Sheets

ENABLING LONG-TERM COMMUNICATION IDLENESS FOR ENERGY EFFICIENCY

FIELD OF THE INVENTION

Embodiments of the invention relate to communication systems; more particularly, energy efficiency of the communication systems.

BACKGROUND OF THE INVENTION

It is becoming increasingly common to find broadband wireless networking capabilities (e.g., IEEE 802.11, 802.16e, etc.) and wired connectivity (e.g., IEEE 802.3) in mobile platforms that favor low power design. In some network environment, maintaining all network devices (wired or wireless) at a fully powered state unnecessarily consumes energy, especially when access to data is sporadic. Power management schemes are used in conjunction with network devices to extend the battery lifetime of mobile communication devices.

A network device may operate in a reduced power state (e.g., standby, sleep, hibernate, etc.) for saving power consumption. However, if the device is in a reduced power state, the device may not be able to receive a data request or data from other networked devices.

BRIEF DESCRIPTION OF THE DRAWINGS

Embodiments of the present invention is illustrated by way of example and is not limited by the figures of the accompanying drawings, in which like references indicate similar elements, and in which.

DETAILED DESCRIPTION OF THE INVENTION

Figure 1:
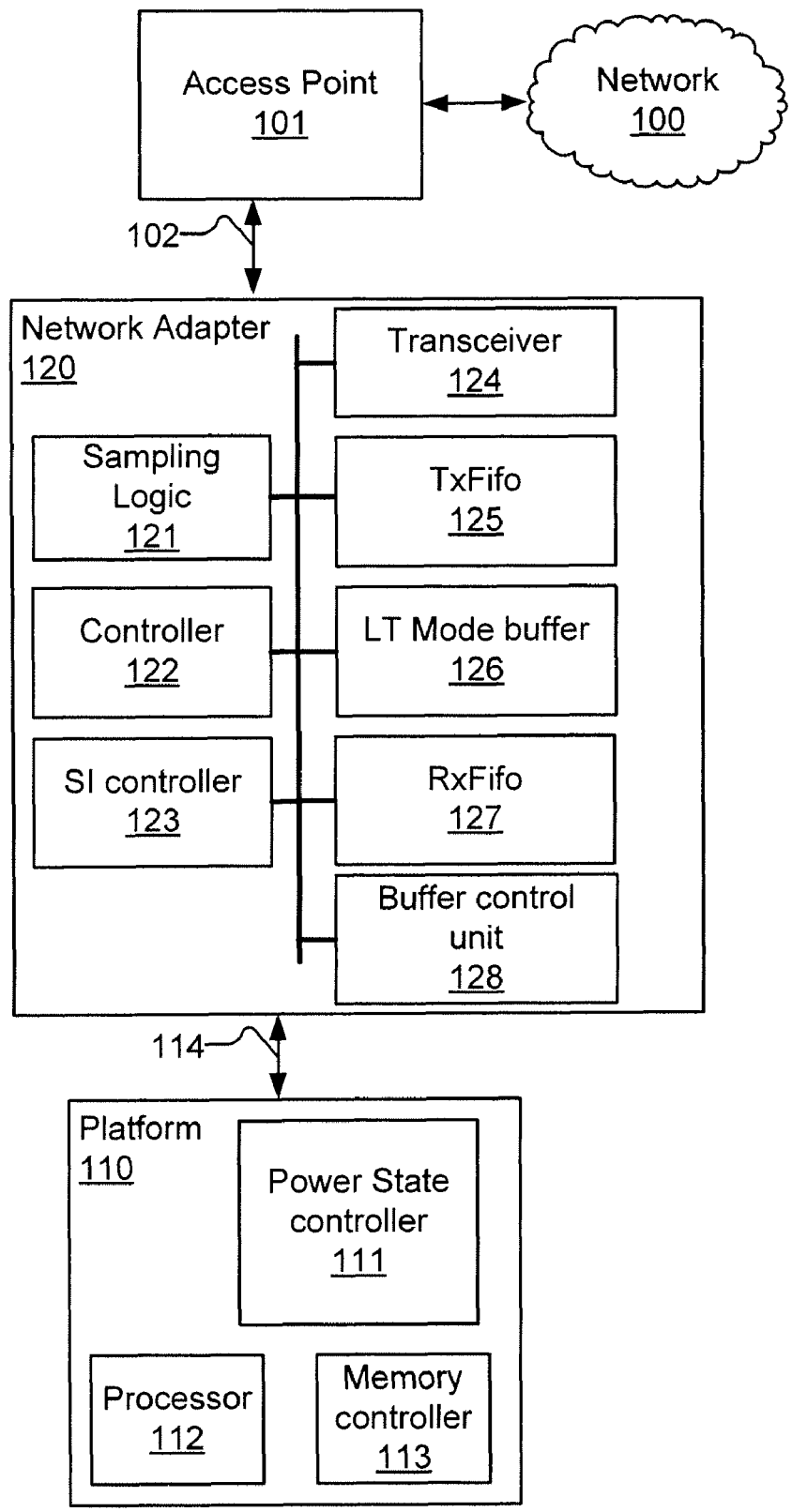
FIG. 1 is a block diagram of a computing platform comprising a network device according to an embodiment of the invention.

Embodiments of an apparatus to determine whether to buffer some received packets before sending the packets to a computing platform are described. In one embodiment, the received packets are buffered for a duration of time rather than being transferred to the computing platform instantly. In one embodiment, the computing platform observes a period of idleness when the packets are being buffered. The computing platform then enters a low operating power state. In one embodiment, the apparatus is a wireless network device. In another embodiment, the apparatus is a wired network device.

In the following description, numerous details are set forth to provide a more thorough explanation of embodiments of the invention. It will be apparent, however, to one skilled in the art, that embodiments of the invention may be practiced without these specific details. In other instances, well-known structures and devices are shown in block diagram form, rather than in detail, in order to avoid obscuring embodiments of the invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The method and apparatus described herein are for enabling long-term communication idleness so that a platform will operate in a reduced power state. Specifically, network adapters are primarily discussed in reference to wireless communication systems. However, the method and apparatus for enabling long-term communication idleness are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads, that utilize data networking.

Overview

FIG. 1 is a block diagram of a computing platform comprising a network device according to an embodiment of the invention. Many related components such as buses and peripherals have not been shown to avoid obscuring the invention. Referring to FIG. 1, the computer system comprises platform 110 and network adapter 120 coupled to access point 101 via interface 102 (e.g., wired interface or wireless interface).

In one embodiment, platform 110 comprises power state controller 111, processor 112, and memory controller 113. In other embodiment, platform 110 further comprises I/O controller and I/O devices (not shown). In one embodiment, network adapter 120 comprises sampling logic 121, controller 122, snoozing interval (SI) controller 123, transceiver 124, transmit fifo (TX fifo) 125, long-term idleness mode (LT mode) buffer 126, receive fifo (RX fifo) 127, and buffer control unit 128.

Other embodiments of the invention, however, may exist in other circuits, logic units, or devices within the system of FIG. 1. Furthermore, in other embodiments of the invention may be distributed throughout one or more circuits, logic units, or devices illustrated in FIG. 1.

In one embodiment, platform 110 comprises a system, such as a cell phone, a personal digital assistant, an embedded controller, a mobile platform, a desktop platform, and a server platform, as well as in conjunction with other resources, such as hardware/software threads, that utilizes network adapter 120 to transmit and receive network packets. In one embodiment, platform 110 is coupled to network adapter 120 via interface 114, such as, for example, one or more computer buses, links, or channels.

In one embodiment, platform 110 comprises processor 112 that executes programs or applications running thereon. In one embodiment, processor 112 is coupled to memory controller 113 to read from and to write to memory (not shown) that stores operating systems, user applications, programs, or combinations thereof.

In one embodiment, power state controller 111 controls a power state of platform 110. In one embodiment, power state controller 111 controls, directly or indirectly, power states of processor 112, memory controller 113, other components (not shown), or combinations thereof. In one embodiment, processor 112, memory controller 113, and other components set their power states based on control signals from power state controller 111.

In one embodiment, network adapter 120 is communicatively coupled to access point 101 (base station) via interface 102. In one embodiment, network adapter 120 comprises a wireless interface for communicating radio-frequency (RF) signals with access point 101. In one embodiment, a wireless interface is an interface based on an IEEE 802.11 compliant wireless network.

In one embodiment, network adapter 120 comprises a wired network interface card (NIC) for communicating with a switch (not shown) via wired compliant network (e.g., IEEE 802.3). In one embodiment, network adapter 120 comprises a cellular network interface for communication with a base station (not shown) via a cellular network (e.g. 3G network).

In one embodiment, TX fifo 125 stores data packets to be transmitted to access point 101 via interface 102. In one embodiment, RX fifo 127 stores data packets received from access point 101 via interface 102. In one embodiment, interface 102 includes one or more channels or links for receiving and transmitting data packets.

In one embodiment, buffer control unit 128 manages operations of TX fifo 125 and RX fifo 127 based on control signals from controller 122. In one embodiment, controller 122 directly manages operations of TX fifo 125 and RX fifo 127. In one embodiment, buffer control unit 128 is integrated with controller 122.

In one embodiment, sampling logic 121 determines, for example, the number of transmit packets, sizes of received packets, arrivals of the received packets, and the intervals between the arrivals, with respect to network traffic at interface 102. In one embodiment, sampling logic 121 determines types of packets (unicast or broadcast) with respect to network traffic at interface 102.

In one embodiment, an interval between two arrivals is referred to herein as inter-packet arrival time. In one embodiment, packet jitter is a variance of inter-packet arrival times (as compared to an expected value obtained from negotiation or predetermined in a protocol). In other words, packet jitter is the variation of arrival times of sequential packets.

For example, in one embodiment, assuming that a voice over internet protocol (VoIP) device sends one RTP (Real Time Protocol) (IETF RFC 1889) packet each 20 milliseconds. If a subsequent RTP packet arrives at next 21 milliseconds, the packet jitter is 1 millisecond (i.e., 21-20). In other embodiment, the packet jitter is calculated with other expressions. In one embodiment, RTP is used to send real-time streams of data across a network. In one embodiment, VoIP is based on a packet-based multimedia communication protocol (e.g., H.323).

In one embodiment, sampling logic 121 determines metrics related to a transmit queue and a receive queue. In one embodiment, such metrics are used to determine categories of data being transferred. In one embodiment, network traffic related to management, control, or broadcast packets as required by various network protocols is referred to herein as background traffic. In one embodiment, the rest of network traffic involving data used by applications, programs, or systems is referred to herein as active traffic. In one embodiment, sampling logic 121 repeats a sampling process every sampling window (e.g., 500 milliseconds). In one embodiment, sampling logic 121 generates results each sampling window.

In one embodiment, background traffic comprises small-sized packets, where packet sizes that are close to MTU (maximum transmission unit) are uncommon. In one embodiment, background traffic is usually found on the receive path only, while small-sized packets associated with active traffic usually uses two-way communication. In one embodiment, the inter-packet arrivals of packets associated with active traffic (e.g., VoIP, multimedia data stream) are substantially uniform. In one embodiment, active traffic comprises mostly unicast packets. Broadcast/multicast packets are not very common in active traffic.

In one embodiment, controller 122 determines whether to change to a long-term idleness mode (LT mode) based at least on results from sampling logic 121. In one embodiment, controller 122 sets network adapter 120 to operate in the LT mode if results from sampling logic 121 indicate that data packets received are background traffic. In one embodiment, controller 122 sets network adapter 120 to a normal mode if controller 122 detects active traffic based on the results from sampling logic 121.

In one embodiment, background traffic includes packets related to acknowledgement, link management, network management, low priority applications (e.g., widgets, mobility applications, instant messaging applications), etc. In one embodiment, delaying such background traffic has little impact on the performance of the quality of service.

In one embodiment, buffer control unit 128 causes some received packets (from interface 102) to be stored in LT mode buffer 126 rather than sending the received packets to platform 110 instantly, if the LT mode is set. In one embodiment, platform 110 observes a period of idleness at interface 114 during which the received packets are buffered. Platform 110 enters a low operating power state if interface 114 has remained idle for a period longer than a predetermined value (e.g., 100 ms, 300 ms). In one embodiment, platform 110 transitions to operate at a lowest operating power state if interface 114 has remained idle for 100 milliseconds. Eventually, buffer control unit 128 sends the received packets stored in LT mode buffer 126 to platform 110 in a burst.

In one embodiment, buffer control unit 128 causes some received packets (from interface 102) to be stored in LT mode buffer 126 instead of in RX fifo 127, if the LT mode is set. In one embodiment, buffer control unit 128 selects which buffer to use by setting control signals of a multiplexer circuit (not shown). Buffer control unit 128 sends received packets stored in LT mode buffer 126 to platform 110 in a burst. In one embodiment, when in a normal mode, received packets stored in RX fifo 127 are sent to platform 110 substantially instantly.

In one embodiment, buffer control unit 128 is operable to regulate network traffic received by controller 122 (from interface 102) by buffering received packets temporarily rather than sending out the received packets to a destination instantly. In one embodiment, the regulated network traffic is subsequently sent to the platform in a burst. The platform is therefore able to operate at a low power state because no packet is expected to arrive at the platform until a next burst happens.

In one embodiment, buffer control unit 128 sends received packets buffered in LT mode buffer 126 in a burst periodically based on a timeout value. In one embodiment, received packets are buffered until a timeout value expires or until active traffic is detected. The timeout value is set in conjunction with a power saving profile, an operating system, a user configuration setting, or combinations thereof.

In one embodiment, buffer control unit 128 is operable such that network adapter 120 does not interrupt a period of quietness which is required by platform 110 to enter a low power state. In one embodiment, buffer control unit 128, in conjunction with controller 122, causes packets of background traffic or idle traffic to be buffered for a time period with little or no impact on the overall performance.

In one embodiment, LT mode buffer 126 is a part of RX fifo 127. In one embodiment, LT mode buffer 126 is a different storage area in addition to RX fifo 127. In one embodiment, the size of LT mode buffer 126 is less than 3 Kbyte (e.g., 2.6 Kbyte). The size of LT mode buffer 126 is different based on network traffic and environment. In one embodiment, a process to enable LT mode is described in further detail below with additional references to the remaining figures.

In one embodiment, access point 101 connects via at least one wireless device to the network infrastructure (e.g., network 100). In one embodiment, access point 101 is coupled to network 100 via wireless interface (e.g., IEEE 802.11-compliant network).

Snoozing Interval

In one embodiment, network adaptor 120 is capable of operating at multiple power states, e.g., transmit, receive, idle, sleep and off. In the idle mode, there is no packet to transmit or receive but transceiver 124 is still on.

In one embodiment, network adapter 120 is a wireless NIC capable of operating in a power-saving mode (PSM). In this power saving mode, network adapter 120 enters a sleep state if network adapter 120 has not received or transmitted packets for a pre-determined duration.

In one embodiment, when there is no data to transmit or receive, network adapter 120 goes into a sleep state while being still connected to the network. In the sleep state, transceiver 124 is turned off for fixed amounts of time that has been pre-negotiated with access point 101. During this time, data directed to the platform 110 is buffered by access point 101. After the sleep duration (snoozing interval) expires, transceiver 124 is turned on to check whether the access point 101 has buffered any data for the device. Network adapter 120 exits the sleep state if there is buffered data, or if at any time data is to be transmitted to the access point.

In one embodiment, a number of different power saving states (e.g., 5 power saving states) are supported by network adapter 120. Each of the power saving states has a different listening interval before network adapter 120 enters a power saving mode. For example, users are allowed to select between a setting that improves battery life and a setting that improves performance. In one embodiment, a shorter listening interval (e.g., 25 milliseconds) is set to improve the battery life. In one embodiment, a longer listening interval (e.g., 100 milliseconds) is set to improve the performance.

In one embodiment, a subscriber station (e.g., network adapter 120) communicates to access point 101 that the subscriber station is going to change into a sleep state. In one embodiment, access point 101 buffers packets until a subscriber station changes to an awake state.

In one embodiment, a snoozing interval represents a time interval required for network adapter 120 to change into the sleep state and again to change into an awake state. In one embodiment, a snoozing interval is a time duration in which a subscriber station is in a sleep state and is not accessible by a network. In one embodiment, a snoozing interval is represented in terms of a number of frames. In one embodiment, a snoozing interval is set to 50 ms, 25 ms, or less.

In other embodiment, a snoozing interval is assigned by access point 101 according to a request from a subscriber station (e.g., network adapter 120).

In one embodiment, access point 101 transmits traffic indication messages (TIM). The TIM informs clients about the presence of buffered packets for the client on access point 101. In one embodiment, broadcast/multicast data are delivered in a delivery traffic indication message (DTIM). In one embodiment, a DTIM is generated at a frequency specified by the DTIM Interval. In one embodiment, a snoozing interval is associated the DTIM interval.

In one embodiment, SI controller 123 determines the snoozing interval of network adapter 120. In one embodiment, the snoozing interval is determined in conjunction with a power saving profile, an operating system, a user configuration setting, or combinations thereof. A process to determine a snoozing interval will be described in further detail below with additional references to FIG. 3.

Operations

Figure 2:
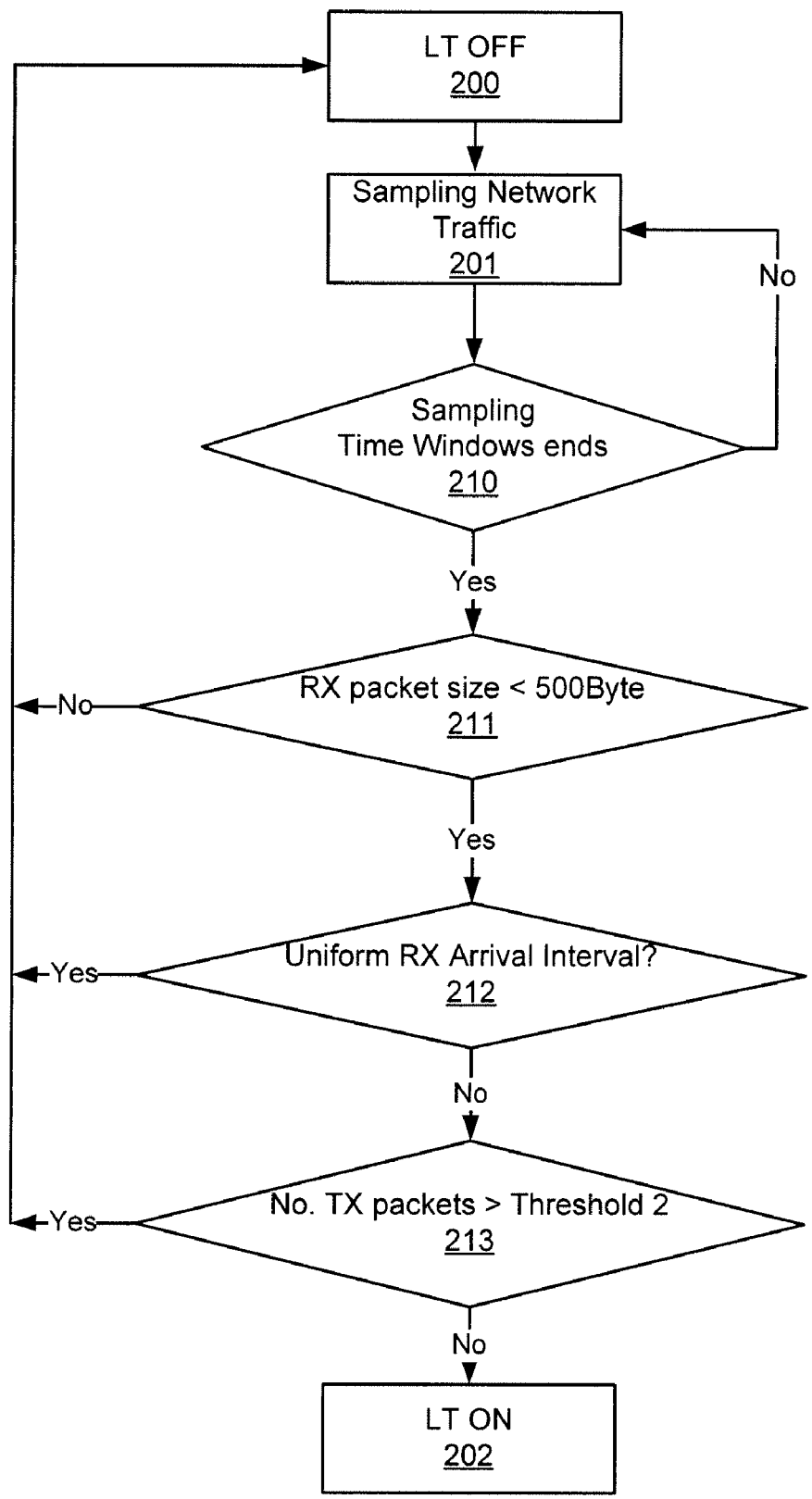
FIG. 2 shows a flow diagram of one embodiment of a process to determine whether to operate in a long-term idleness mode.

FIG. 2 shows a flow diagram of one embodiment of a process to determine whether to operate in a long-term idleness mode (LT mode). The process is performed by processing logic that may comprise hardware (circuitry, dedicated logic, etc.), software (such as one that is run on a general purpose computer system or a dedicated machine), or a combination of both. In one embodiment, the process is performed in conjunction with a network adapter (e.g., network adapter 120 in FIG. 1). In one embodiment, the process is performed by a computer system with respect to FIG. 5.

In one embodiment, the process begins with the LT mode is set to off. In one embodiment, processing logic samples data (metrics) associated with network traffic periodically (process block 201). In one embodiment, the sampled data include a number of transmit packets, sizes of received packets, arrivals of the received packets, and the intervals between the arrivals (inter-packets arrivals).

In one embodiment, processing logic determines whether a sampling time window has lapsed (processing block 210). If the sampling time has not lapsed, processing logic continues to perform sampling on network traffic (process block 201). Otherwise, processing logic proceeds to determine whether to operate in the LT mode based on results (or parts of the results) from the sampling.

In one embodiment, processing logic compares sizes of received packets with a threshold value (process block 211). In one embodiment, the threshold value is 500 bytes. If any receive packet size (during the sampling period) is larger than 500 bytes, process logic sets the LT mode to off (process block 200).

Otherwise, processing logic further compares whether the intervals between arrivals are substantially uniform. In one embodiment, uniform arrivals of packets indicate that the packets are voice over IP (VoIP) packets (or packets for real time streaming multimedia, for example, video conference, web casting, etc.) associated with active traffic. In one embodiment, processing logic compares variations of the intervals (packet jitter values) with a predetermined packet jitter value (e.g., 2 ms, 4 ms, etc.) (process block 212).

In one embodiment, if arrivals of received packets are uniform, processing logic determines that the LT mode is off. Otherwise, processing logic further compares the number of transmit packets with a threshold number (e.g., 5) (process block 213). If the number of transmit packets is higher than the threshold number, processing logic sets LT mode to off (process block 200). Otherwise, processing logic sets the LT mode to on (process block 202).

In one embodiment, operating in the LT mode indicates that network traffic comprises background traffic. Processing logic causes those packets to be buffered for a time period. A platform, a receiver of those buffered packets, observes an uninterrupted period of idleness. The platform then operates in a reduced power state. In one embodiment, those buffered packets will be sent to the platform (the receiver) after a timeout or if processing logic detects active traffic based at least on a condition as described above.

In one embodiment, processing logic is capable of determining whether to operate in the LT mode based on results from sampling without reading into contents of network packets. In one embodiment, processing logic is capable of determining whether to operate in the LT mode without reading and interpreting headers of the network packets. In one embodiment, processing logic is capable to determine whether to operate in the LT mode based only on results from sampling without decrypting network packets that are usually encrypted, such that less time or less resource are required to perform the determination. In other embodiments, more or fewer conditions are incorporated in the process to determine whether to transition to the LT mode.

In one embodiment, a platform, receives packets from the network adapter, requires 100 milliseconds of idle period so that the platform switches to a sleep state. Without buffering at the network adapter, the platform less frequently operates in a reduced power state because the platform receives packets every less than 100 milliseconds (e.g., 50 milliseconds, 25 milliseconds, or sporadically). In one embodiment, a platform sets a duration in which the platform operates in a reduced power state. The duration is determined such that power saving is improved even if the calculation includes energy used when transitioning to different power. In one embodiment, receive packets are buffered at the network adapter for at least the duration of time.

In one embodiment, by switching to the LT mode, a network adapter buffers packets related to background traffic, until a timeout value expires or until active traffic is detected. In one embodiment, the network adapter buffers the received packets for a period longer than 100 ms (as required by the platform) such that the platform switches to a reduced power state to save power. In one embodiment, the timeout is set to a value, such as, for examples, 25 ms, 50 ms, or 100 ms.

In one embodiment, whether to transition to the LT mode is determined in conjunction with a power saving profile, an operating system, a user configuration setting, or combinations thereof. In one embodiment, the LT mode is an optional feature associated with a power saving profile.

Figure 3:
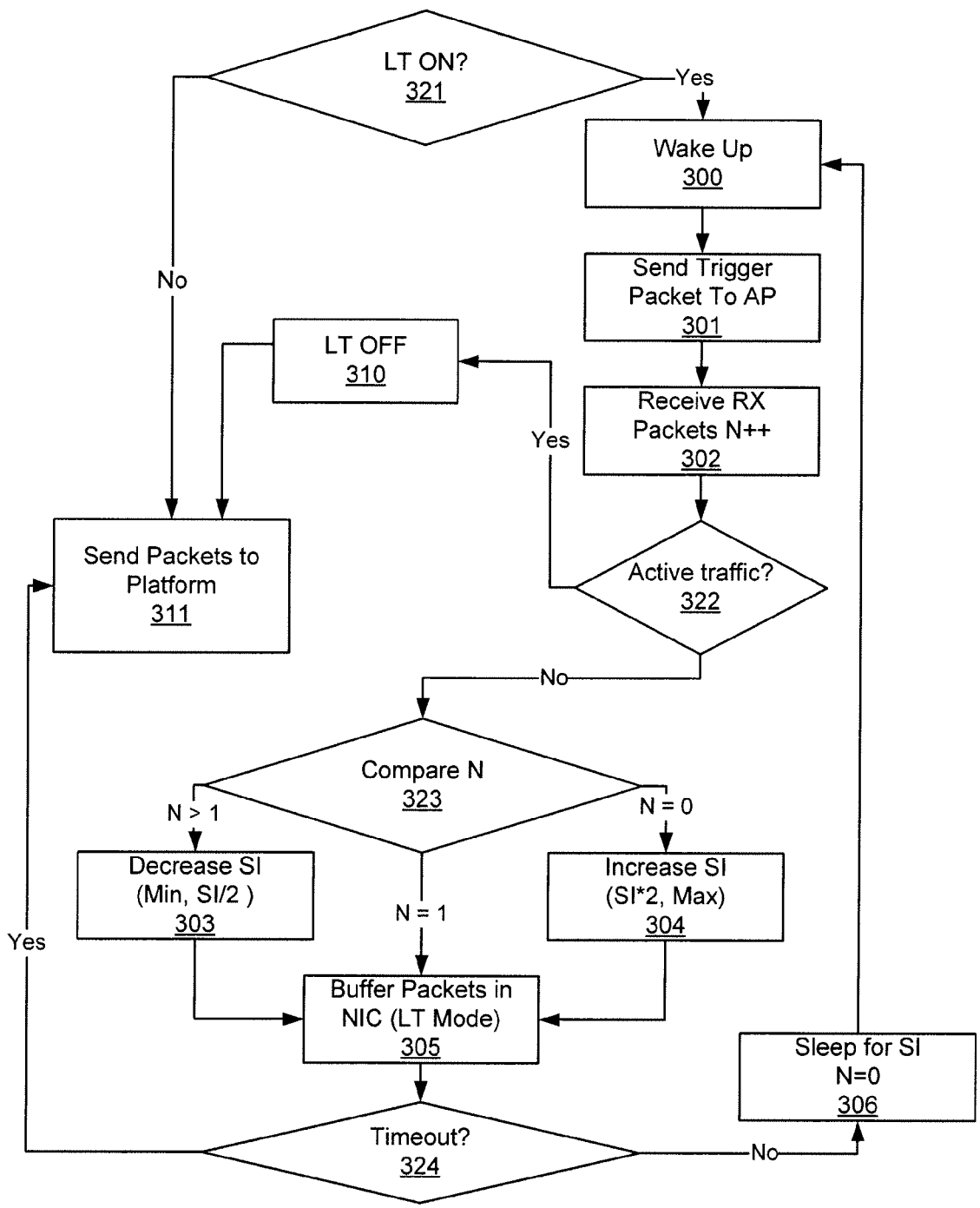
FIG. 3 shows a flow diagram of one embodiment of a process to determine a snoozing interval (SI).

FIG. 3 shows a flow diagram of one embodiment of a process to determine a snoozing interval (SI) of an apparatus (e.g., network adapter 120). The process is performed by processing logic that may comprise hardware (circuitry, dedicated logic, etc.), software (such as one that is run on a general purpose computer system or a dedicated machine), or a combination of both. In one embodiment, the process is performed in conjunction with a network adapter (e.g., network adapter 120 in FIG. 1). In one embodiment, the process is performed by a computer system with respect to FIG. 5.

In one embodiment, the snoozing interval is determined in conjunction with a power saving profile, an operating system, a user configuration setting, or combinations thereof. In one embodiment, the process begin by processing logic determines whether an LT mode is in effect (process block 321). If the LT mode is not in effect, processing logic sends packets to a platform (process block 311). Otherwise, processing logic determines a minimum value and a maximum value for the snoozing interval. In one embodiment, the values are user-configurable. In one embodiment, the minimum value is 50 milliseconds, whereas the maximum value is 6 DTIM intervals (e.g., 600 milliseconds).

In one embodiment, processing logic sets a network adapter to operate is an awake mode (process block 300). Processing logic sends trigger frames to an access point to inform the access point about status of the network adapter (process block 301) or to inform that the network adapter is ready to receive data packets from the access point.

In one embodiment, processing logic causes data packets (or data frames) to be received from the access point. In one embodiment, processing logic also counts the number of received packets which is referred to herein as N (process block 302).

In one embodiment, processing logic determines whether the received packets are related to active traffic based on sampling results (process block 322). In one embodiment, the sampling results include several data with respect to network traffic, such as, for example, the number of transmit packets, sizes of received packets, arrivals of the received packets, and the intervals between the arrivals. In one embodiment, the process to determine active or background traffic is described above with additional references to FIG. 2. In one embodiment, the process to determine active or background traffic is performed based on fewer or more conditions described in FIG. 2.

In one embodiment, if the traffic is active traffic, processing logic sets the LT mode to off (process block 310). In one embodiment, processing logic further sends the received packets to the computing platform without any additional buffering stage (process block 311).

In one embodiment, if the traffic is not active traffic, processing logic determines a new snoozing interval value for the network adapter. In one embodiment, processing logic determines the snoozing interval based on the number of received packets (N) (process block 323). In one embodiment, if N is 1, processing logic let the snoozing interval remain unchanged (process block 305).

In one embodiment, if N is larger than 1, processing logic reduces the snoozing interval. In one embodiment, processing logic reduces the snoozing interval by half, or sets the snoozing interval to the minimum value if the half interval is lower than the minimum value (process block 303).

In one embodiment, if N is 0, processing logic increases the snoozing interval. In one embodiment, processing logic doubles the snoozing interval, or sets the snoozing interval to the maximum value if the new interval is larger than the maximum value (process block 304).

In one embodiment, processing logic causes the received packets to be buffered in conjunction with operations of the LT mode (process block 305). In one embodiment, the received packets are buffered in a buffer region (e.g., a part of receive fifo or a separate buffer region) until a timeout value lapses. In one embodiment, the timeout value is set to 100 milliseconds.

In one embodiment, processing logic determines whether the timeout value has lapsed (process block 324). If the timeout has lapsed, processing logic sends the received packets to the computing platform (process block 311). Otherwise, processing logic sets the network adapter to operate in a sleep state for a period of the snoozing interval. In one embodiment, processing logic also resets N value to 0 (process block 306).

In one embodiment, processing logic repeats the process by setting the network adapter to operate in an awake mode (process block 300).

Figure 4:
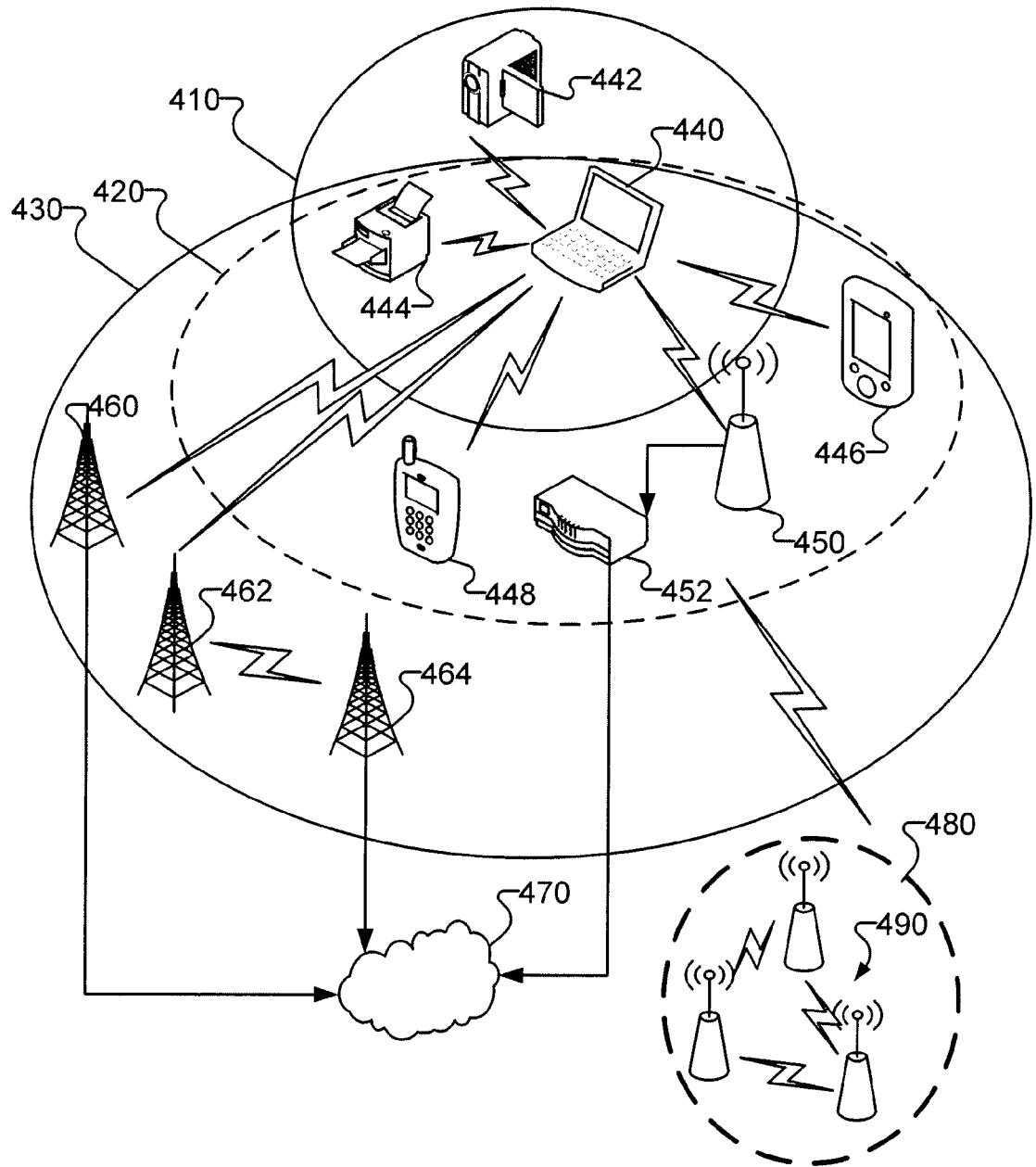
FIG. 4 is a diagram representation of a wireless communication system in accordance with one embodiment of the invention.

FIG. 4 is a diagram representation of a wireless communication system in accordance with one embodiment of the invention. Referring to FIG. 4, in one embodiment, wireless communication system 400 includes one or more wireless communication networks, generally shown as 410, 420, and 430.

In one embodiment, the wireless communication system 400 includes a wireless personal area network (WPAN) 410, a wireless local area network (WLAN) 420, and a wireless metropolitan area network (WMAN) 430. In other embodiments, wireless communication system 400 includes additional or fewer wireless communication networks. For example, wireless communication network 400 includes additional WPANs, WLANs, and/or WMANs. The methods and apparatus described herein are not limited in this regard.

In one embodiment, wireless communication system 400 includes one or more subscriber stations (e.g., shown as 440, 442, 444, 446, and 448). For example, the subscriber stations 440, 442, 444, 446, and 448 include wireless electronic devices such as, for example, a desktop computer, a laptop computer, a handheld computer, a tablet computer, a cellular telephone, a pager, an audio/video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and other suitable fixed, portable, or mobile electronic devices. In one embodiment, wireless communication system 400 includes more or fewer subscriber stations.

In one embodiment, subscriber stations 440, 442, 444, 446, and 448 use a variety of modulation techniques such as spread spectrum modulation (e.g., direct sequence code division multiple access (DS-CDMA), frequency hopping code division multiple access (FH-CDMA), or both), time-division multiplexing (TDM) modulation, frequency-division multiplexing (FDM) modulation, orthogonal frequency-division multiplexing (OFDM) modulation, multi-carrier modulation (MDM), other suitable modulation techniques, or combinations thereof to communicate via wireless links.

In one embodiment, laptop computer 440 operates in accordance with suitable wireless communication protocols that require very low power, such as, for example, Bluetooth™, ultra-wide band (UWB), radio frequency identification (RFID), or combinations thereof to implement the WPAN 410. In one embodiment, laptop computer 440 communicates with devices associated with the WPAN 410, such as, for example, video camera 442, printer 444, or both via wireless links.

In one embodiment, laptop computer 440 uses direct sequence spread spectrum (DSSS) modulation, frequency hopping spread spectrum (FHSS) modulation, or both to implement the WLAN 420 (e.g., a basic service set (BSS) network in accordance with the 802.11 family of standards developed by the Institute of Electrical and Electronic Engineers (IEEE) or variations and evolutions of these standards). For example, laptop computer 440 communicates with devices associated with the WLAN 420 such as printer 444, handheld computer 446, smart phone 448, or combinations thereof via wireless links.

In one embodiment, laptop computer 440 also communicates with access point (AP) 450 via a wireless link. AP 450 is operatively coupled to router 452 as described in further detail below. Alternatively, AP 450 and router 452 may be integrated into a single device (e.g., a wireless router).

In one embodiment, laptop computer 440 uses OFDM modulation to transmit large amounts of digital data by splitting a radio frequency signal into multiple small sub-signals, which in turn, are transmitted simultaneously at different frequencies. In one embodiment, laptop computer 440 uses OFDM modulation to implement WMAN 430. For example, laptop computer 440 operates in accordance with the 802.16 family of standards developed by IEEE to provide for fixed, portable, mobile broadband wireless access (BWA) networks (e.g., the IEEE std. 802.16, published 2004), or combinations thereof to communicate with base stations, shown as 460, 462, and 464, via wireless link(s).

Although some of the above examples are described above with respect to standards developed by IEEE, the methods and apparatus disclosed herein are readily applicable to many specifications, standards developed by other special interest groups, standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.), or combinations thereof. The methods and apparatus described herein are not limited in this regard.

WLAN 420 and WMAN 430 are operatively coupled to network 470 (public or private), such as, for example, the Internet, a telephone network (e.g., public switched telephone network (PSTN)), a local area network (LAN), a cable network, and another wireless network via connection to an Ethernet, a digital subscriber line (DSL), a telephone line, a coaxial cable, any wireless connection, etc., or combinations thereof.

In one embodiment, WLAN 420 is operatively coupled to network 470 via AP 450 and router 452. In another embodiment, WMAN 430 is operatively coupled to network 470 via base station(s) 460, 462, 464, or combinations thereof. Network 470 includes one or more network servers (not shown).

In one embodiment, wireless communication system 400 includes other suitable wireless communication networks, such as, for example, wireless mesh networks, shown as 480. In one embodiment, AP 450, base stations 460, 462, and 464 are associated with one or more wireless mesh networks. In one embodiment, AP 450 communicates with or operates as one of a plurality of mesh points (MPs) 490 of wireless mesh network 480. In one embodiment, AP 450 receives and transmits data in connection with one or more of the plurality of MPs 490. In one embodiment, the plurality of MPs 490 include access points, redistribution points, end points, other suitable connection points, or combinations thereof for traffic flows via mesh paths. MPs 490 use any modulation techniques, wireless communication protocols, wired interfaces, or combinations thereof described above to communicate.

In one embodiment, wireless communication system 400 includes a wireless wide area network (WWAN) such as a cellular radio network (not shown). Laptop computer 440 operates in accordance with other wireless communication protocols to support a WWAN. In one embodiment, these wireless communication protocols are based on analog, digital, or dual-mode communication system technologies, such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless access technologies (e.g., 3G, 4G, etc.) standards based on these technologies, variations and evolutions of these standards, and other suitable wireless communication standards. Although FIG. 4 depicts a WPAN, a WLAN, and a WMAN, In one embodiment, wireless communication system 400 includes other combinations of WPANs, WLANs, WMANs, and WWANs. The methods and apparatus described herein are not limited in this regard.

In one embodiment, wireless communication system 400 includes other WPAN, WLAN, WMAN, or WWAN devices (not shown) such as, for example, network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, other suitable communication system, or combinations thereof.

In one embodiment, subscriber stations (e.g., 440, 442, 444, 446, and 448) AP 450, or base stations (e.g., 460, 462, and 464) includes a serial interface, a parallel interface, a small computer system interface (SCSI), an Ethernet interface, a universal serial bus (USB) interface, a high performance serial bus interface (e.g., IEEE 1394 interface), any other suitable type of wired interface, or combinations thereof to communicate via wired links. Although certain examples have been described above, the scope of coverage of this disclosure is not limited thereto.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 5:
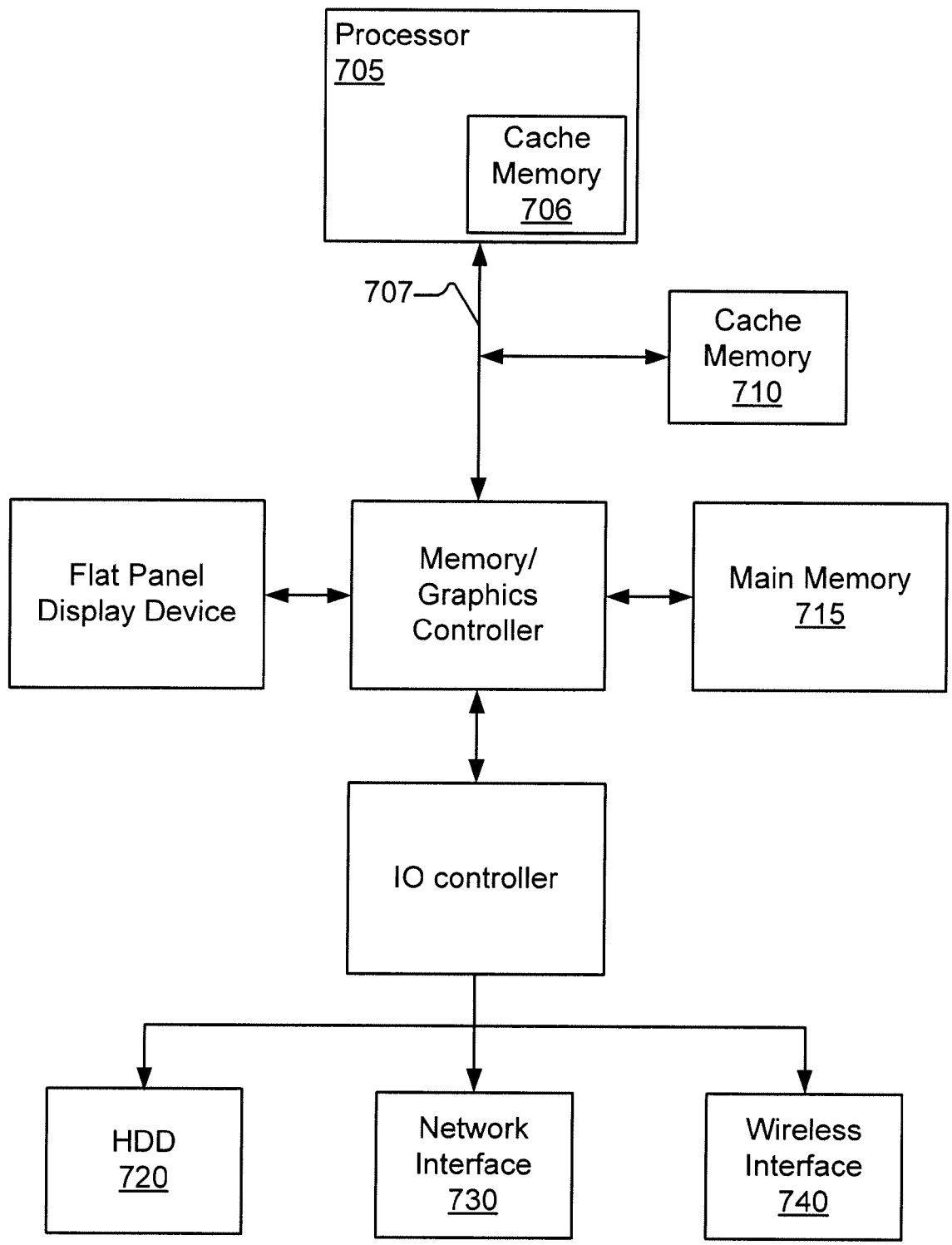
FIG. 5 illustrates a computer system for use with one embodiment of the invention.

FIG. 5, for example, illustrates a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

Figure 6:
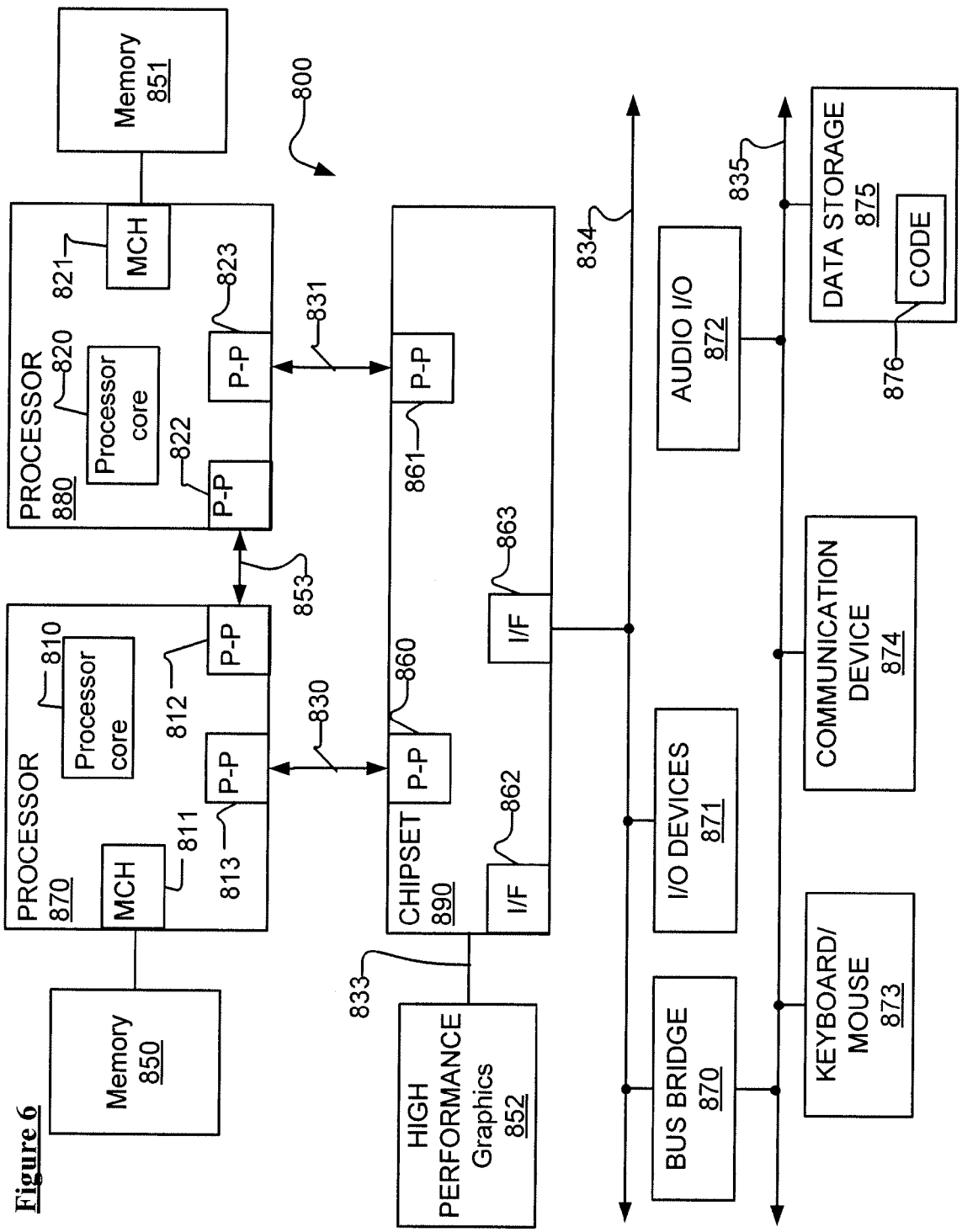
FIG. 6 illustrates a point-to-point computer system for use with one embodiment of the invention.

Similarly, at least one embodiment may be implemented within a point-to-point computer system. FIG. 6, for example, illustrates a computer system that is arranged in a point-to-point (PtP) configuration. In particular, FIG. 6 shows a system where processors, memory, and input/output devices are interconnected by a number of point-to-point interfaces.

The system of FIG. 6 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or coupled to data storage 875, or coupled to memory 850 of FIG. 6.

Other embodiments of the invention, however, may exist in other circuits, logic units, or devices within the system of FIG. 6. Furthermore, in other embodiments of the invention may be distributed throughout several circuits, logic units, or devices illustrated in FIG. 6.

The invention is not limited to the embodiments described, but can be practiced with modification and alteration within the spirit and scope of the appended claims. For example, it should be appreciated that the invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the invention are not limited to the same. As manufacturing techniques (e.g., photolithography) mature over time, it is expected that devices of smaller size could be manufactured.

Whereas many alterations and modifications of the embodiment of the invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A network adapter comprising:
    a first controller to change to a first mode from a second mode based at least in part on
        a number of transmit packets;
        sizes of a first plurality of received packets; and
        intervals between arrivals of the first plurality of received packets; and
    a first memory to buffer one or more received packets, wherein the one or more received packets are buffered longer in the first mode than in the second mode,
        wherein the first controller is set to the first mode if
            the number of transmit packets is smaller than a first threshold value;
            the sizes of the first plurality of received packets are smaller than a second threshold value; and
            differences of the intervals are not within a first jitter value.

2. The network adapter of claim 1, wherein the first buffer comprises a first memory for use in the first mode and a second memory for use in the second mode.

3. The network adapter of claim 1, further comprising a buffer control unit to send the one or more received packets from the network adapter to a platform in a burst repeatedly every first duration.

4. The network adapter of claim 1, wherein the first controller is operable to determine, without reading contents of network packets and without decrypting encrypted network packets, whether to transition to the first mode.

5. The network adapter of claim 1, further comprising a buffer control unit to send the one or more received packets from the network adapter to a platform in a burst repeatedly every first duration, wherein the first duration is set accordingly to a power saving profile associated with the platform, wherein the platform enters a sleep state more frequently if the buffer control unit operates in the first mode than if the buffer control unit operates in the second mode.

6. The network adapter of claim 1, wherein the first controller is operable to determine whether to go to the first mode in conjunction with settings in user profiles.

7. The network adapter of claim 1, wherein the first controller is operable to repeatedly determine, at every sampling interval,
    the number of transmit packets;
    the sizes of a first plurality of received packets; and
    the intervals between arrivals of the first plurality of received packets.

8. The network adapter of claim 1, further comprising a second controller to increase or to decrease snoozing intervals (SI) of the network adapter based at least on the first mode and a number of the first plurality of received packets.

9. The network adapter of claim 1, further comprising a second controller to decrease a snoozing interval (SI) of the network adapter if more than one packet is received.

10. A system comprising:
    a platform comprising at least a processor and a memory controller;
    a network adapter to determine whether to change to a first mode from a second mode based at least in part on
        a number of transmit packets;
        sizes of a first plurality of received packets; and
        intervals between arrivals of the first plurality of received packets; and
    a first memory to buffer one or more received packets, wherein the one or more received packets are buffered longer in the first mode than in the second mode,
        wherein the network adapter is operable to transition to the first mode if the number of transmit packets is smaller than a first threshold value;
        the sizes of the received packets are smaller than a second threshold value; and
        differences of the intervals are not within a first jitter value.

11. The system of claim 10, wherein the network adapter is operable to determine, without reading contents of network packets and without decrypting encrypted network packets, whether to transition to the first mode.

12. The system of claim 10, wherein the network adapter comprises a buffer control unit to send the one or more received packets from the network adapter to a platform in a burst repeatedly every first duration.

13. The system of claim 10, wherein the network adapter comprises a buffer control unit to send the one or more received packets from the network adapter to a platform in a burst repeatedly every first duration, wherein the first duration is set accordingly to a power saving profile associated with the platform, wherein the platform enters a sleep state more frequently if the buffer control unit operates in the first mode than if the buffer control unit operates in the second mode.

14. The system of claim 10, wherein the network adapter comprises a controller to increase or to decrease snoozing intervals (SI) of the network adapter based at least on the first mode and a number of the first plurality of received packets.

15. The system of claim 10, wherein the network adapter comprises a controller to decrease a snoozing interval (SI) of the network adapter if more than one packet is received.

16. The system of claim 10, wherein the network adapter is part of the platform.

17. A method comprising:
    determining whether to change to a first mode from a second mode based at least in part on
        a number of transmit packets,
        sizes of a first plurality of received packets, and
        intervals between arrivals of the first plurality of received packets;
    storing one or more received packets for a longer period in the first mode than in the second mode; and transitioning to the first mode if the number of transmit packets is smaller than a first threshold value;
the sizes of the first plurality of received packets are smaller than a second threshold value; and
differences of the intervals are not within a first jitter value.

18. The method of claim 17, wherein the determining whether to change to the first mode is performed without reading contents of network packets and without decrypting encrypted network packets.

19. The method of claim 17, further comprising sending the one or more received packets to a platform in a burst repeatedly every first duration.

20. The method of claim 17, further comprising increasing or decreasing snoozing intervals (SI) of a network adapter based at least on the first mode and a number of the first plurality of received packets.

21. The method of claim 17, further comprising decreasing a snoozing interval (SI) of a network adapter if more than one packet is received.

22. The method of claim 17, further comprising increasing a snoozing interval (SI) of a network adapter if no packet is received.

* * * * *